(12) United States Patent
Wu et al.

(10) Patent No.: US 12,015,608 B2
(45) Date of Patent: Jun. 18, 2024

(54) DATA GATEWAY SYSTEM AND DATA INTERCOMMUNICATION METHOD

(71) Applicants: Digiwin Software Co., Ltd, Shanghai (CN); DATA SYSTEMS CONSULTING CO., LTD., New Taipei (TW)

(72) Inventors: Kuan-Hui Wu, Shanghai (CN); Guoxin Sun, Shanghai (CN)

(73) Assignees: Digiwin Software Co., Ltd, Shanghai (CN); DATA SYSTEMS CONSULTING CO., LTD., New Taipei (TW)

( * ) Notice: Subject to any disclaimer, the term of this patent is extended or adjusted under 35 U.S.C. 154(b) by 378 days.

(21) Appl. No.: 17/520,629

(22) Filed: Nov. 6, 2021

(65) Prior Publication Data
US 2023/0103712 A1 Apr. 6, 2023

(30) Foreign Application Priority Data

Sep. 29, 2021 (CN) .......................... 202111150956.6

(51) Int. Cl.
| H04L 29/06 | (2006.01) |
| H04L 9/40 | (2022.01) |
| H04L 43/50 | (2022.01) |
| H04L 67/561 | (2022.01) |

(52) U.S. Cl.
CPC .......... *H04L 63/0876* (2013.01); *H04L 43/50* (2013.01); *H04L 63/0236* (2013.01); *H04L 63/0435* (2013.01); *H04L 63/20* (2013.01); *H04L 67/561* (2022.05)

(58) Field of Classification Search
CPC ... H04L 63/0876; H04L 67/561; H04L 43/50; H04L 63/0435
USPC ............................................................ 726/4
See application file for complete search history.

(56) References Cited

U.S. PATENT DOCUMENTS 11,284,258 B1 * 3/2022 Wei .................... H04L 63/10

* cited by examiner

*Primary Examiner* — Lan Dai T Truong
(74) *Attorney, Agent, or Firm* — JCIPRNET (57) ABSTRACT

A data gateway system and a data intercommunication method are provided. The data gateway system includes a client system and a cloud server. The client system includes a first connector module and a listener module. The cloud server includes a second connector module and an authentication management module. The listener module performs a command listening for the cloud server. When the listener module obtains a connection configuration information, the client system sends a connection request command to the cloud server through the first connector module, so that the cloud server receives the connection request command through the second connector module, and issues a gateway code. The cloud server sends the gateway code to the first connector module of the client system through the second connector module, so that the client system establishes a connection between the client system and the cloud server based on the gateway code.

20 Claims, 6 Drawing Sheets

DATA GATEWAY SYSTEM AND DATA INTERCOMMUNICATION METHOD

CROSS-REFERENCE TO RELATED APPLICATION

This application claims the priority benefit of China application serial no. 202111150956.6, filed on Sep. 29, 2021. The entirety of the above-mentioned patent application is hereby incorporated by reference herein and made a part of this specification.

BACKGROUND

Technical Field

The disclosure relates to a data interactive transmission technology, in particular to a data gateway system and a data intercommunication method adopted between public cloud tenants and their private environments.

Description of Related Art

Nowadays, most of the management systems and data of enterprises are established in a private environment (intranet of enterprise) of the corporate environment, so that it is possible to effectively achieve security and isolation of corporate information. Moreover, with the emergence of cloud application services, companies started to adopt software-as-a-service (SaaS) management software to make management more convenient and efficient. In this regard, the application of SaaS is normally established in a public cloud environment, whereas the business information of the enterprise is stored in the enterprise. In other words, it is often required to perform data intercommunication and exchange between the two; as a result, there are several solutions for connection in the market. For example, data transmission can be carried out between a company's internal network and a public network through a virtual private network (VPN) connection, or a company can use a SaaS public network and a specific interface to establish connection to the internal network of the company. However, the conventional VPN connection method has the problems of high cost, complex structure and difficulty in maintenance. Besides, the method of establishing connection to the company's internal network through a specific interface also raises the concern of poor security. Even the aforementioned methods have issues about data storage compliance.

SUMMARY

The disclosure is directed to a data gateway system and a data intercommunication method, which can achieve a high-security data intercommunication function between a private cloud environment and a public cloud environment.

According to an embodiment of the disclosure, a data gateway system of the disclosure includes a client system and a cloud server. The client system is set in a private cloud environment. The client system includes a first connector module and a listener module. The cloud server is set up in a public cloud environment. The cloud server includes a second connector module and an authentication management module. The listener module performs a command listening for the cloud server. When the listener module obtains a connection configuration information, the client system sends a connection request command to the cloud server through the first connector module, so that the cloud server receives the connection request command through the second connector module, and determines whether the client system has a permission through the authentication management module according to the connection request command, so as to issue a gateway code. The cloud server sends the gateway code to the first connector module of the client system through the second connector module, so that the client system establishes a connection between the client system and the cloud server based on the gateway code.

According to an embodiment of the disclosure, the data intercommunication method of the disclosure includes the following steps: the listener module of the client system performs a command listening for the cloud server; when the listener module obtains a connection configuration information, the client system sends a connection request command to the cloud server through the connector module; the second connector module of cloud server receives the connection request command; the authentication management module of the cloud server determines whether the client system has the permission according to the connection request command so as to issue a gateway code; the second connector module of the cloud server sends the gateway code to the first connector module of the client system; and the client system establishes a connection between the client system and the cloud server based on the gateway code.

Based on the above, the data gateway system and data intercommunication method of the disclosure can establish a gateway system between a client system set in a private cloud environment and a cloud server set in a public cloud environment, and the gateway system can be adopted to realize a high-security data intercommunication function.

In order to make the above-mentioned features and advantages of the disclosure more comprehensible, the following specific embodiments are described in detail in conjunction with the accompanying drawings.

DESCRIPTION OF THE EMBODIMENTS

Reference will now be made in detail to the exemplary embodiments of the present disclosure, and examples of the exemplary embodiments are illustrated in the accompanying drawings. Whenever possible, the same reference symbols are used in the drawings and descriptions to indicate the same or similar parts.

Figure 1:
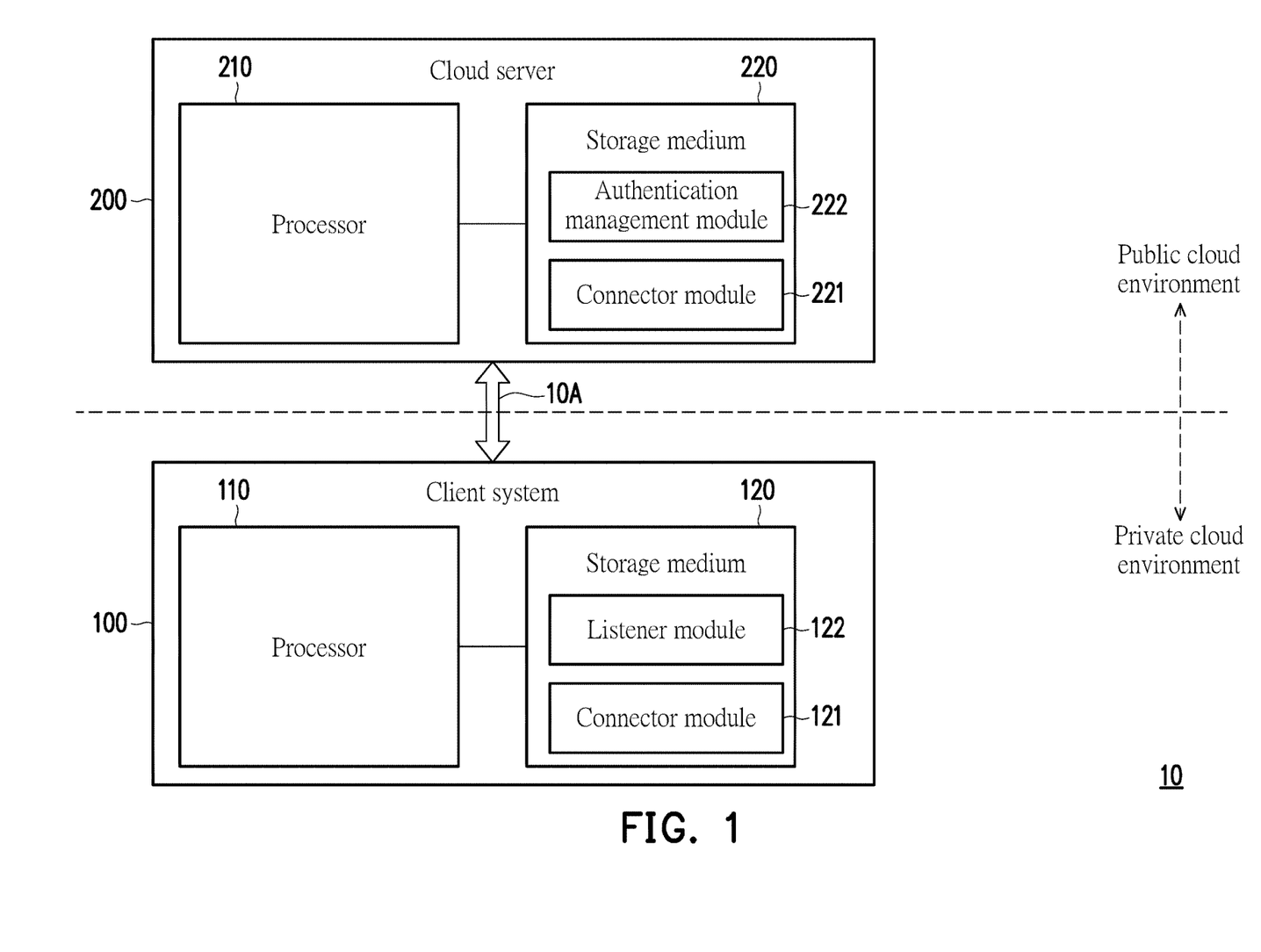
FIG. 1 is a schematic diagram of a data gateway system according to an embodiment of the disclosure.

FIG. 1 is a schematic diagram of a data gateway system according to an embodiment of the disclosure. Referring to FIG. 1, the data gateway system 10 includes a client system 100 and a cloud server 200. The client system 100 may be set in a private cloud environment, and the cloud server 200 may be set in a public cloud environment. The client system 100 includes a processor 110 and a storage medium 120. The processor 110 is coupled to the storage medium 120. The storage medium 120 can store the connector module 121 and the listener module 122. The client system 100 may further include a physical connector or a physical connection interface, so that the connector module 121 can transmit data through the physical connector or the physical connection interface. The connector module 121 can, for example, execute an algorithm corresponding to a specific communication standard to perform a data transmission function through a physical connector or a physical connection interface. The cloud server 200 includes a processor 210 and a storage medium 220. The storage medium 220 can store the connector module 221 and the authentication management module 222. The cloud server 200 may further include a physical connector or a physical connection interface, so that the connector module 221 can transmit data through the physical connector or the physical connection interface. In this embodiment, the client system 100 can establish a connection 10A with the connector module 221 of the cloud server 200 through the connector module 121 to realize the data intercommunication function.

In this embodiment, the processors 110 and 210 may respectively include processing circuits or control circuits such as a central processing unit (CPU), a microprocessor (MCU), or a field programmable gate array (FPGA), etc., but the disclosure is not limited thereto. The storage media 120 and 220 may be memories, such as a dynamic random access memory (DRAM), a flash memory, or a non-volatile random access memory (NVRAM), but the disclosure is not limited thereto. In this embodiment, the storage mediums 120 and 220 can respectively store a plurality of modules, algorithms and/or software, etc., for the processors 110 and 210 to read and execute them, respectively. The processors 110 and 210 as well as the storage mediums 120 and 220 can determine their hardware types and implementations according to the application scenarios of the client system 100 and the cloud server 200, but the disclosure is not limited thereto.

In this embodiment, the cloud server 200 can be adopted, for example, to provide software-as-a-service (SaaS) application functions or provide users with enterprise data search function and so on. In this embodiment, the client system 100 and the cloud server 200 can communicate via a network, and establish a connection 10A of a connection channel specifically for data transmission. In other embodiments of the disclosure, the cloud server 200 can also communicate with multiple client systems that respectively belong to different private cloud environments, and respectively establish multiple connections for multiple connection channels specifically for data transmission based on the data intercommunication method provided by the disclosure.

Figure 2:
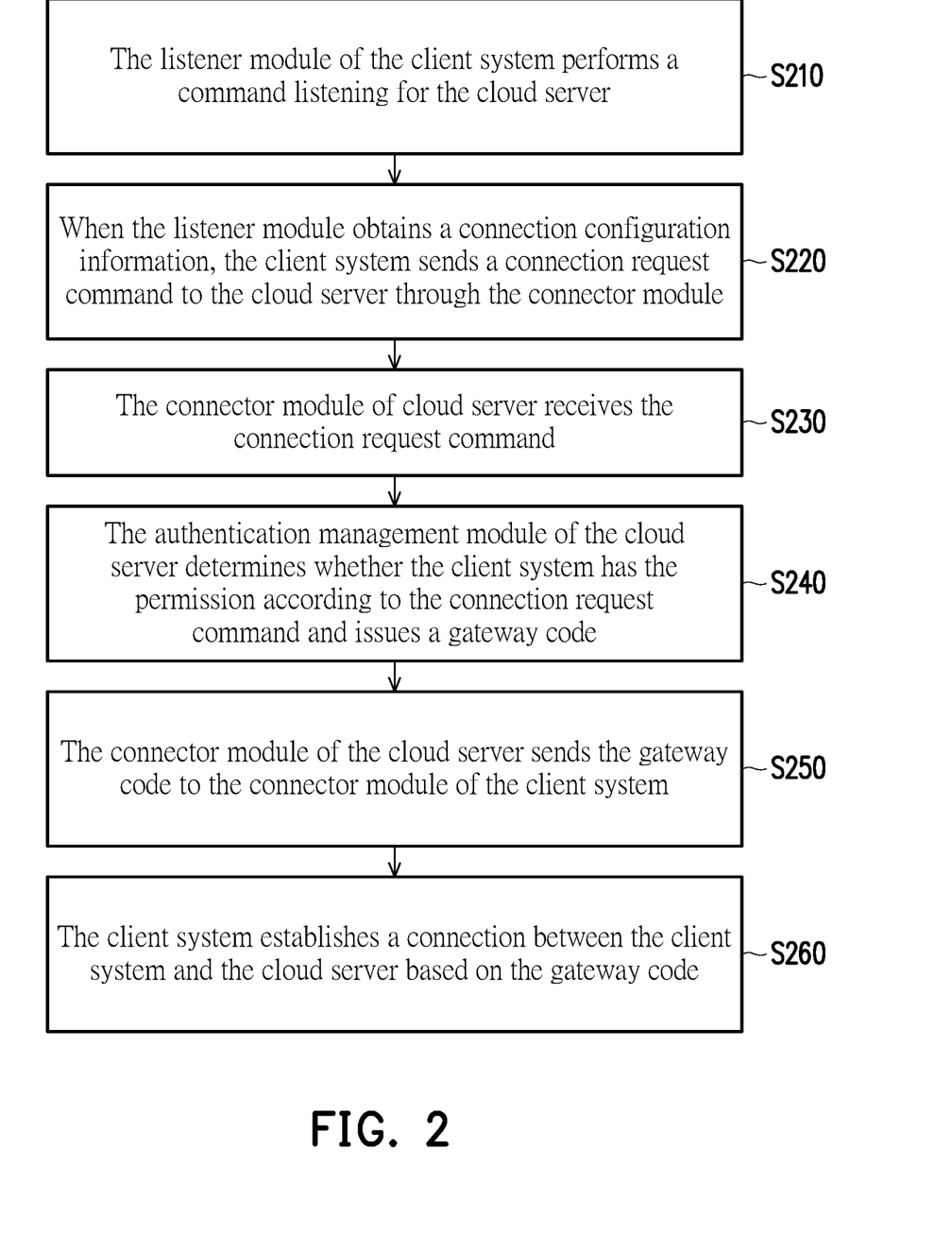
FIG. 2 is a schematic flowchart of a data intercommunication method according to an embodiment of the disclosure.

FIG. 2 is a flowchart of a data intercommunication method according to an embodiment of the disclosure. Referring to FIG. 1 and FIG. 2, the data gateway system 10 may perform the following steps S210 to S260 to establish a connection 10A. In step S210, the listener module 122 of the client system 100 performs a command listening for the cloud server 200. In step S220, when the listener module 122 obtains connection configuration information, the client system 100 sends a connection request command to the cloud server 200 through the connector module 121. In step S230, the connector module 221 of cloud server 200 receives the connection request command. In step S240, the authentication management module 222 of the cloud server 200 determines whether the client system 100 has permission according to the connection request command, so as to issue a gateway code. In step S250, the connector module 221 of the cloud server 200 sends the gateway code to the connector module 121 of the client system 100. In step S260, the client system 100 establishes a connection 10A between the client system 100 and the cloud server 200 according to the gateway code. In this manner, there is no need to establish a specific line (physical/virtual) between the public cloud and the private cloud between the client system 100 and the cloud server 200 in this embodiment, a public network is sufficient for realization. Moreover, the settings of the client system 100 can be configured by the cloud server 200. The data gateway system 10 of this embodiment can automatically establish a connection 10A, and can perform high-security data transmission.

Figure 3:
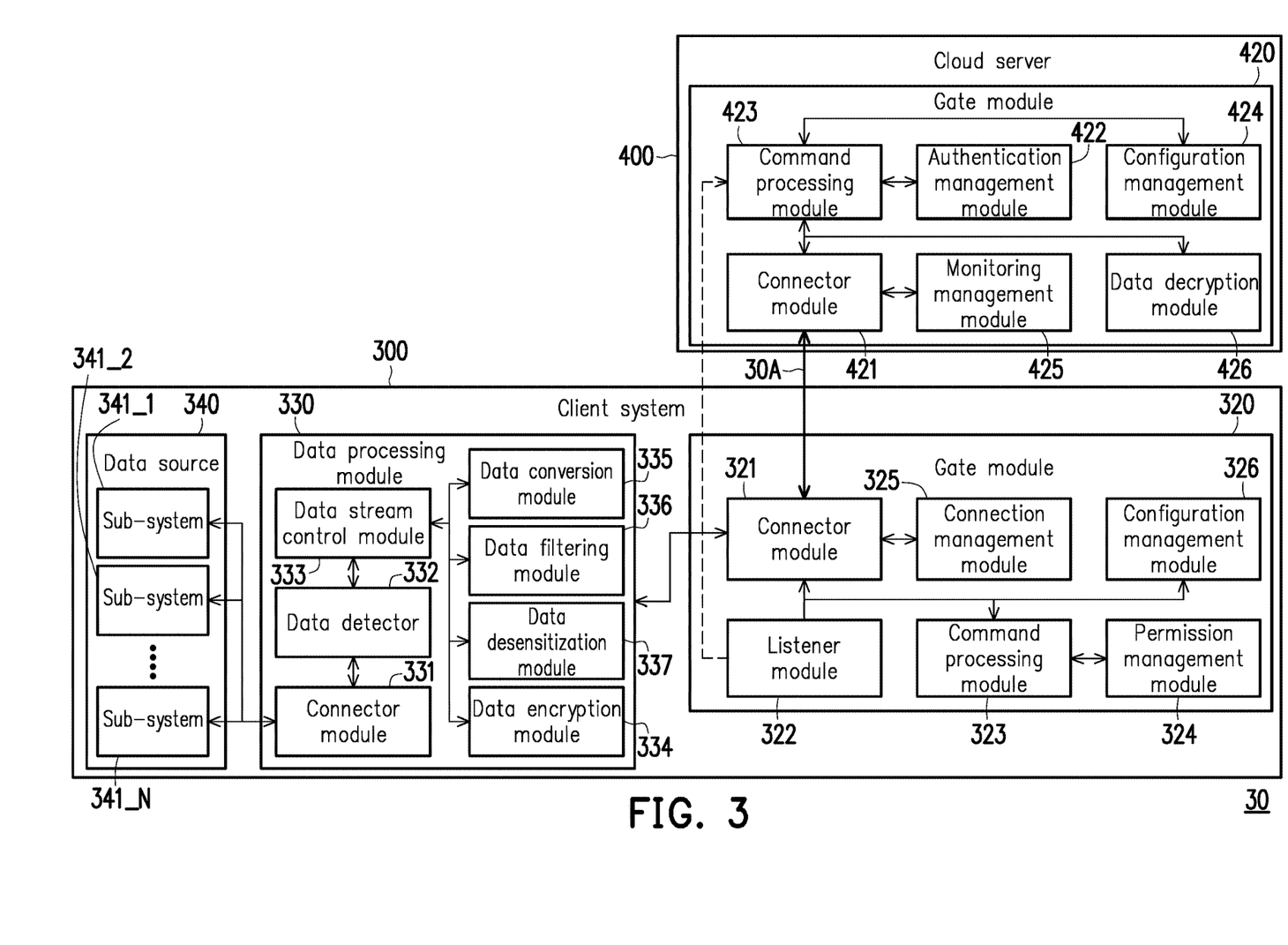
FIG. 3 is a schematic diagram of a data gateway system according to another embodiment of the disclosure.

FIG. 3 is a schematic diagram of a data gateway system according to another embodiment of the disclosure. Referring to FIG. 3, the data gateway system 30 includes a client system 300 and a cloud server 400. The client system 300 may be set in a private cloud environment, and the cloud server 400 may be set in a public cloud environment. The client system 300 and the cloud server 400 may respectively include a processor and a storage medium as shown in FIG. 1. In this embodiment, the client system 300 may include a gateway module 320, a data processing module 330, and a data source 340. The gateway module 320 and the data processing module 330 may be software or algorithms stored in the storage medium of the client system 300, for example. The data source 340 may include multiple sub-systems 341_1 to 341_N, and N is a positive integer. The sub-systems 341_1 to 341_N can be, for example, a database corresponding to multiple business systems, and are used to store relevant business data respectively. The processor of the client system 300 can execute multiple modules in the gateway module 320 and the data processing module 330. In this embodiment, the gateway module 320 includes a connector module 321, a listener module 322, a command processing module 323, a permission management module 324, a connection management module 325, and a configuration management module 326. The data processing module 330 includes a connector module 331, a data detector 332, a data stream control module 333, and a data encryption module 334. The data processing module 330 further includes but is not limited to a data conversion module 335, a data filtering module 336 and a data desensitization module 337. The data processing module 330 may further include modules with other data processing functions.

In this embodiment, the cloud server 400 may include a gateway module 420. The cloud server 400 can execute multiple modules in the gateway module 420. The gateway module 420 may be, for example, software or an algorithm stored in the storage medium of the cloud server 400. The gateway module 420 may include a connector module 421, an authentication management module 422, a command processing module 423, a configuration management module 424, a monitoring management module 425, and a data decryption module 426. In this regard, the functions of the modules of this embodiment will be described in detail by the following embodiments in FIG. 4 to FIG. 6.

Figure 4:
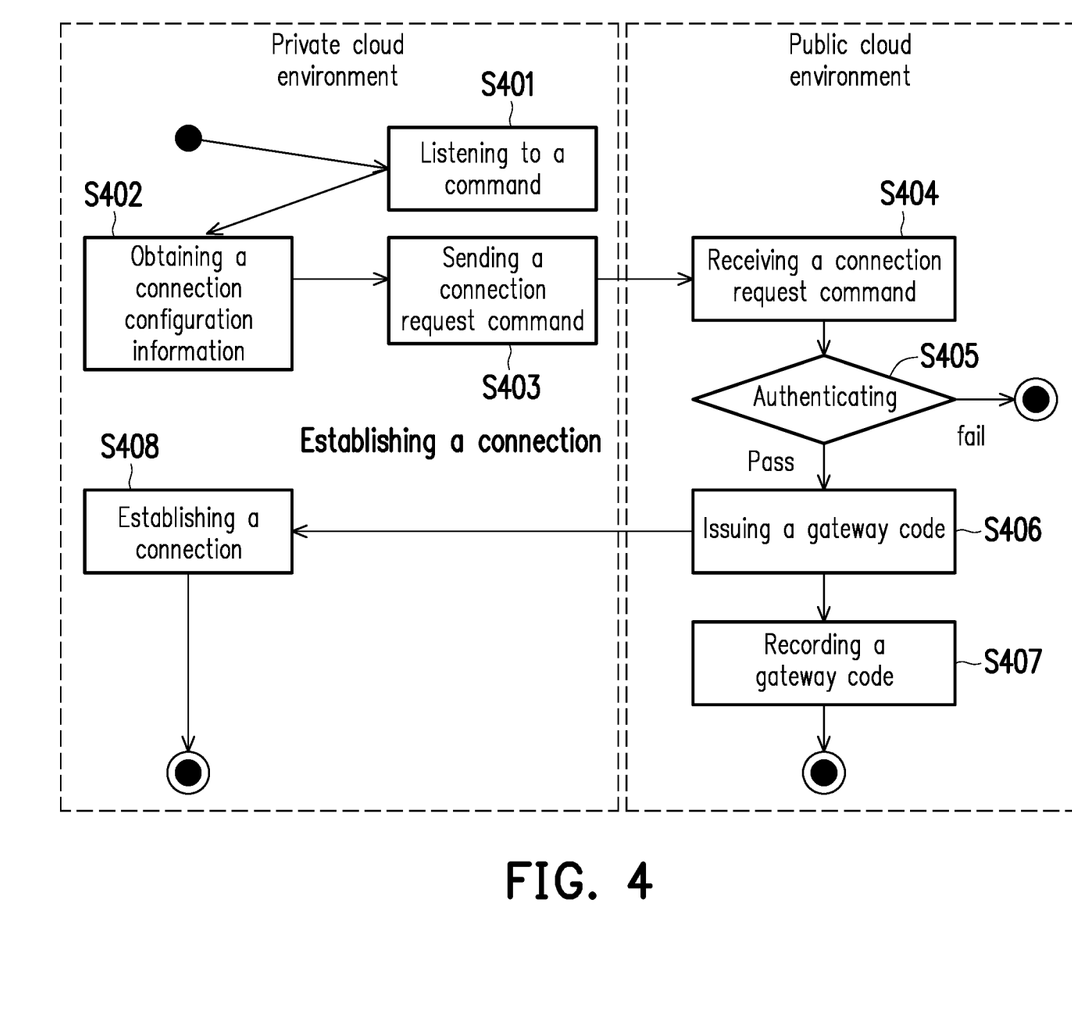
FIG. 4 is a schematic flowchart of establishing a connection according to an embodiment of the disclosure.

FIG. 4 is a schematic flowchart of establishing a connection according to an embodiment of the disclosure. Referring to FIG. 3 and FIG. 4, the multiple steps of the private cloud environment shown in FIG. 4 are executed by the client system 300, and the multiple steps of the public cloud environment shown in FIG. 4 are executed by the cloud server 400. In step S401, the listener module 322 can perform command listening to listen to whether the command processing module 423 of the gateway module 420 (via the public network) generates connection configuration information. In this embodiment, when a user wants to connect to the client system 300 through the cloud server 400, the configuration management module 424 of the gateway module 420 can generate connection configuration information according to user operations, and provide the connection configuration information to the command processing module 423. The connection configuration information may include, for example, a client's special account and a special password input by the user.

In step S402, when the command processing module 423 has connection configuration information, the listener module 322 accesses the connector module 421 of the cloud server 400 through the connector module 321, and obtains the connection configuration information from the command processing module 423. In step S403, the connection management module 325 can send a connection request command to the cloud server 400 through the connector module 321 according to the connection configuration information. In step S404, the connector module 421 of the cloud server 400 can receive a connection request command. In step S405, the command processing module 423 can perform authentication according to the connection request command through the authentication management module 422. If authentication is not passed, it means that the client system 300 does not have permission and no operation is performed. If authentication is passed, it means that the client system 300 has permission. In step S406, the authentication management module 422 may issue a gateway code to be sent to the client system 300 through the connector module 421. In step S407, the configuration management module 424 can store the gateway code of the client to record related connection information. In step S408, the connection management module 325 can establish a connection 30A for the special data transmission channel between the client system 300 and the cloud server 400 according to the gateway code, and the configuration management module 326 can store the gateway code. In this way, a connection 30A can be effectively established between the client system 300 and the cloud server 400. It should be noted that in this embodiment, the data gateway system 30 uses the client system 300 to listen to whether the cloud server 400 has the requirement for connection (or requirement for data transmission), and then automatically establishes a connection 30A. In other words, the connection 30A will only be established when the cloud server 400 has requirement for connection. In this way, the client system 300 can achieve high security with data self-control, and can also provide the function of cloud data service.

Figure 5:
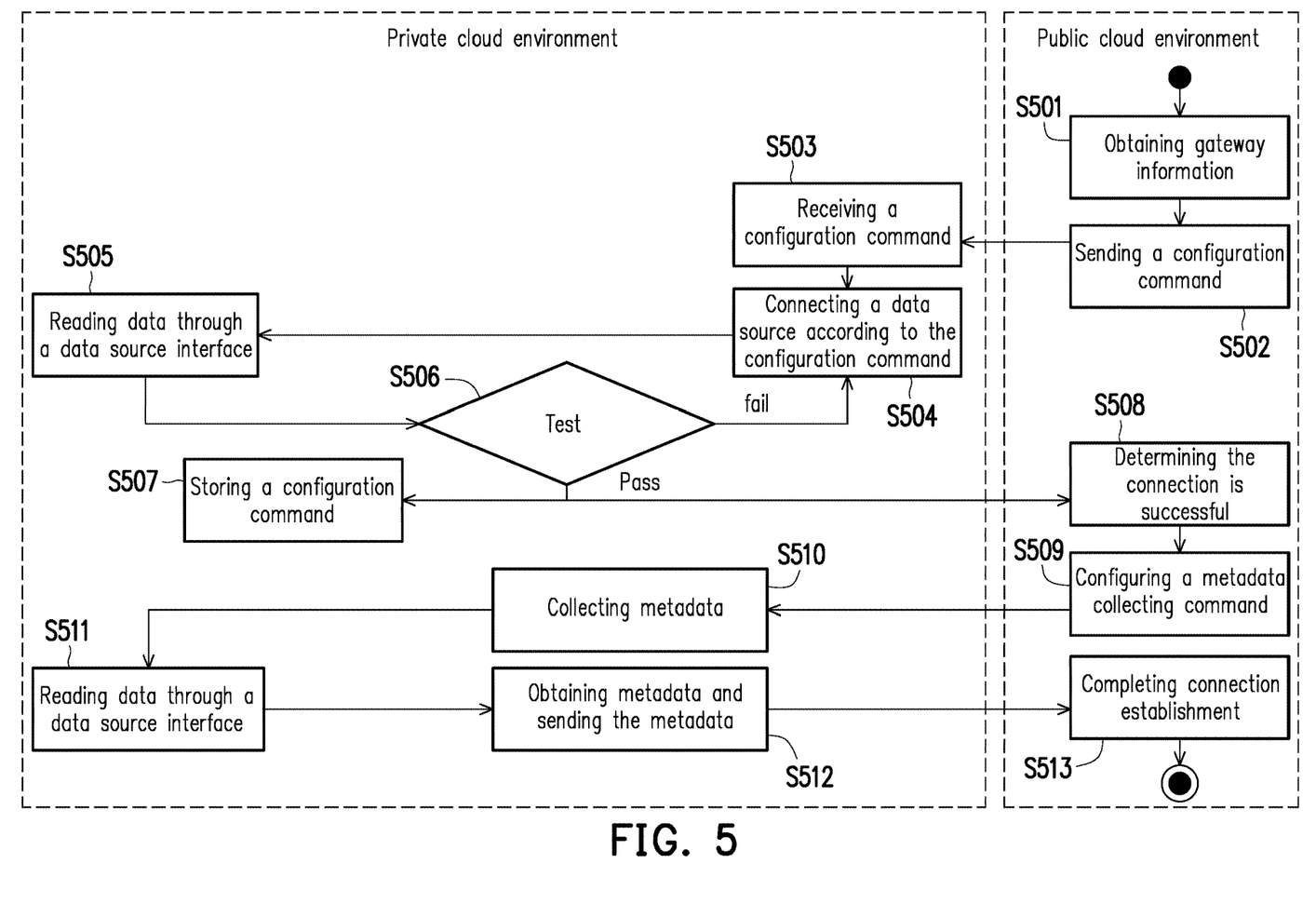
FIG. 5 is a schematic flowchart of obtaining configuration data according to an embodiment of the disclosure.

FIG. 5 is a schematic flowchart of obtaining configuration data according to an embodiment of the disclosure. Referring to FIG. 3 and FIG. 5, the multiple steps of the private cloud environment shown in FIG. 5 are executed by the client system 300, and the multiple steps of the public cloud environment shown in FIG. 5 are executed by the cloud server 400. After the connection 30A is established between the cloud server 400 and the client system 300, in step S501, the command processing module 423 can obtain the gateway information input by the user. The gateway information may, for example, include the stored gateway code. In step S502, the command processing module 423 can obtain the corresponding configuration information from the configuration management module 424 according to the gateway code, and issue a configuration command to the client system 300. The configuration information may include, for example, the name, type, Internet Protocol address, and permission information of the database, but the disclosure is not limited thereto. In this embodiment, the client system 300 can perform a connection test according to the configuration command through the connection management module 325.

In step S503, the connector module 321 of the client system 300 can receive a configuration command. In step S504, the connection management module 325 can connect to the data source 340 through the connector module 321 according to the configuration command. In step S505, the connector module 331 of the data processing module 330 can read data through the data source interface to obtain connection test data. In step S506, the connection management module 325 may perform a connection test according to the connection test data. When the connection test fails, the client system 300 can perform the connection test again according to the configuration command through the connection management module 325, so as to try to connect to the data source 340 through the connector module 321 again according to the configuration command. When the connection test is passed, the client system 300 can notify the cloud server 400 that the connection is successful through the connector module 321. In addition, in step S507, when the connection test is passed, the client system 300 may store the configuration command in the configuration management module 326. In step S508, the command processing module 423 of the gateway module 420 can determine that the connection is successful. In step S509, the command processing module 423 can configure a metadata collection command, and send the metadata collection command to the client system 300 through the connector module 421. The metadata collection command can be used, for example, to set the data source table and the information of relevant field that the user wants to obtain.

In step S510, the gateway module 320 of the client system 300 can connect to at least one of the sub-systems 341_1 to 341_N in the data source 340 through the data processing module 330 according to the metadata collection command to collect the metadata. In step S511, the gateway module 320 can read data through the data source interface of the data source 340, and can perform data processing on the read data through the data processing module 330. In step S512, the gateway module 320 can obtain the metadata, and the connector module 321 sends the metadata to the cloud server 400 through the connection 30A. In step S513, the command processing module 423 of the cloud server 400 can determine the connection configuration is completed based on the metadata, and can provide field information to the user (for example, display or output field information).

Figure 6:
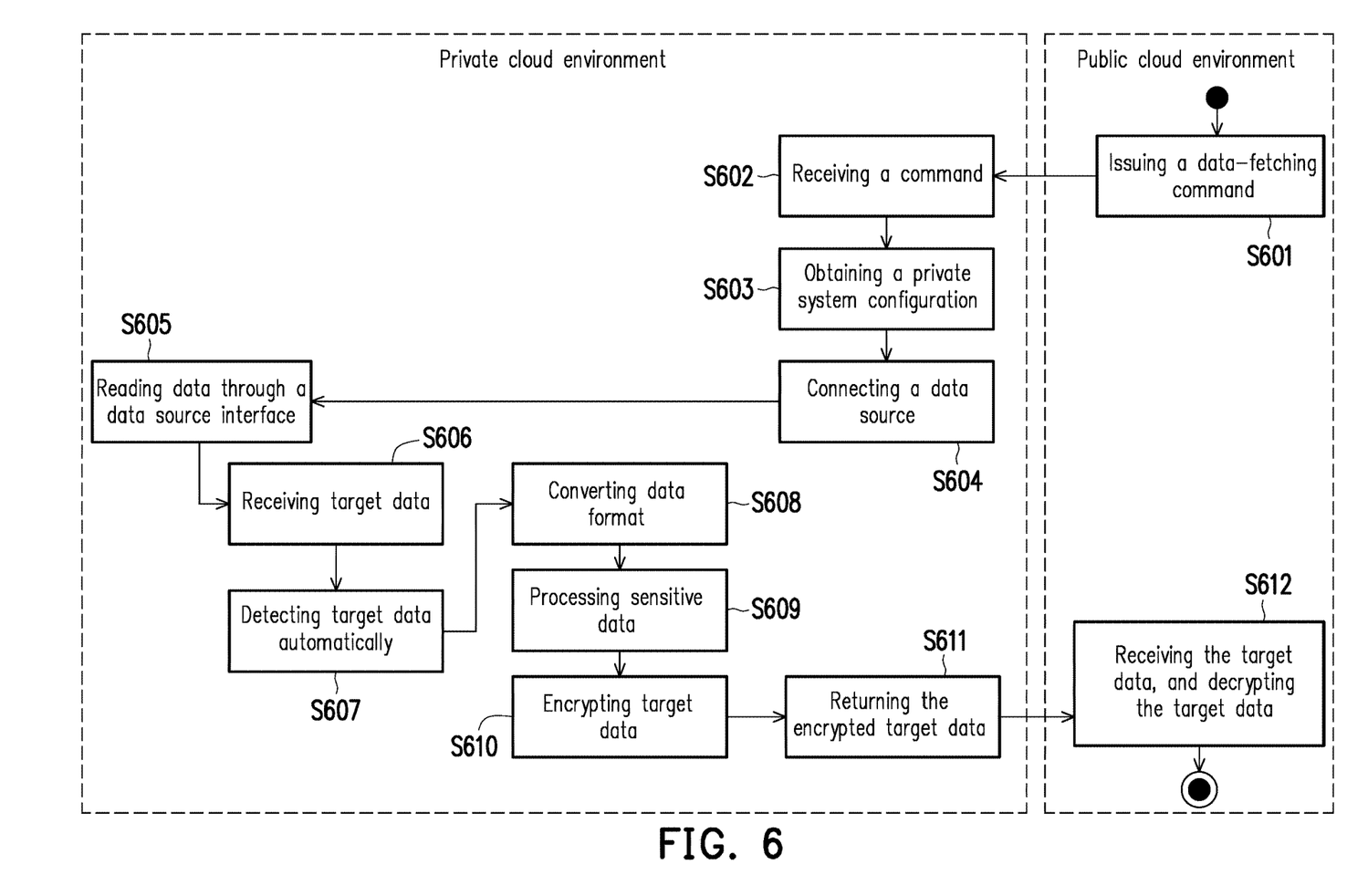
FIG. 6 is a schematic flowchart of obtaining data according to an embodiment of the disclosure.

FIG. 6 is a schematic flowchart of obtaining data according to an embodiment of the disclosure. Referring to FIG. 3 and FIG. 6, the multiple steps of the private cloud environment shown in FIG. 6 are executed by the client system 300, and the multiple steps of the public cloud environment shown in FIG. 6 are executed by the cloud server 400. After the user obtains the field information through the cloud server 400, the user can provide the information of the data content to be obtained to the cloud server 400 according to the field information. In step S601, the command processing module 423 of the cloud server 400 can issue a data-fetching command to the client system 300 through the connector module 421. In step S602, the gateway module 320 of the client system 300 can receive the command through the connector module 321. In step S603, the gateway module 320 can obtain the private system configuration according to the data-fetching command. The private system configuration may, for example, include the name, type, Internet protocol address, and permission information of the database of at least one of the sub-systems 341_1 to 341_N. In step S604, the connector module 331 of the data processing module 330 can connect to at least one of the sub-systems 341_1 to 341_N in the data source 340 according to the private system configuration.

In step S605, the connector module 331 of the data processing module 330 can read data through the data source interface. In step S606, the connector module 331 of the data processing module 330 can receive the target data. In step S607, the data detector 332 of the data processing module 330 can automatically detect the target data. In step S608, the data conversion module 335 of the data processing module 330 can convert the format of the target data, so that the target data conforms to the data format of the data to be obtained by the cloud server 400. In step S609, the data filtering module 336 and the data desensitization module 337 of the data processing module 330 can process the sensitive data in the target data. The data filtering module 336 can perform data filtering on the target data. The data desensitization module 337 can desensitize the target data. The target data can include, for example, a person's name and a contact number, and the data filtering module 336 and the data desensitization module 337 can filter or desensitize the contact number in the target data to output part of the data content. It should be noted that the aforementioned steps S608 and S609 can be performed selectively, and the data processing module 330 of the disclosure can perform at least one of data format conversion, data filtering, and data desensitization on the target data. In an embodiment, the data processing module 330 may further perform other data processing methods on the target data.

Then, in step S610, the data encryption module 334 can encrypt the target data. The data processing module 330 can provide the encrypted target data to the gateway module 320. In step S611, the connector module 321 of the gateway module 320 can return the encrypted target data to the cloud server 400. In step S612, the cloud server 400 can decrypt the encrypted target data through the data decryption module 426 to obtain the target data. Therefore, the data gateway system 30 of this embodiment can perform desensitization processing and transmission encryption on the data output by the client system 300, so as to realize the data mutual transmission function that is safe and meets the data transmission and data confidentiality regulations.

In summary, the data gateway system and data intercommunication method of the disclosure can establish a data gateway between a client system set up in a private cloud environment and a cloud server set up in a public cloud environment to achieve data exchange function with high security. Moreover, the data gateway system of the disclosure does not need to consume too much hardware resources, nor does it need to install a local database, etc., so as to effectively reduce cost and complexity.

Finally, it should be noted that the above embodiments are only used to illustrate the technical solutions of the disclosure, but not to limit them. Although the disclosure has been described in detail with reference to the foregoing embodiments, those of ordinary skill in the art should understand that: the technical solutions recorded in the foregoing embodiments can still be modified, or some or all of the technical features can be equivalently replaced. These modifications or replacements do not make the essence of the corresponding technical solutions deviate from the scope of the technical solutions in the embodiments of the disclosure.

What is claimed is:

1. A data gateway system, comprising:
 a client system, set in a private cloud environment, and the client system comprising:
  a first connector module; and
  a listener module;
 a cloud server, set in a public cloud environment, and the cloud server comprising:
  a second connector module; and
  an authentication management module,
 wherein the listener module performs a command listening for the cloud server, when the listener module obtains connection configuration information, the client system sends a connection request command to the cloud server through the first connector module, so that the cloud server receives the connection request command through the second connector module, and determines whether the client system has a permission through the authentication management module according to the connection request command, so as to issue a gateway code,
 wherein the cloud server sends the gateway code to the first connector module of the client system through the second connector module, so that the client system establishes a connection between the client system and the cloud server based on the gateway code.

2. The data gateway system according to claim 1, wherein the client system comprises a first gateway module, and the first gateway module comprises the first connector module, the listener module, and a first command processing module,
 wherein the cloud server comprises a second gateway module, and the second gateway module comprises the second connector module, the authentication management module, and a second command processing module,
 wherein the listener module of the client system listens to the second command processing module of the cloud server to determine whether the second command processing module generates the connection configuration information.

3. The data gateway system according to claim 2, wherein the second gateway module
 stores the gateway code in a configuration management module when the authentication management module issues the gateway code.

4. The data gateway system according to claim 3, wherein the second gateway module further comprises:
 a connection management module, wherein when the second command processing module of the cloud server obtains gateway information, the second command processing module obtains a configuration command from the configuration management module according to the gateway information, and sends the configuration command to the first gateway module of the client system through the second connector module, so that the client system performs a connection test through the connection management module according to the configuration command.

5. The data gateway system according to claim 4, wherein the first gateway module further comprises:
 a data source interface, the connection management module performing the connection test on the data source interface,
 when the connection test fails, the client system performing the connection test again according to the configuration command through the connection management module,
 when the connection test is passed, the client system notifying the cloud server that the connection is successful through the first connector module.

6. The data gateway system according to claim 5, wherein the first gateway module further comprises:

a configuration management module, wherein when the connection test is passed, the client system stores the configuration command in the configuration management module.

7. The data gateway system according to claim 5, wherein when the connection test is passed, the second command processing module of the cloud server configures a metadata collection command, and sends the metadata collection command to the client system through the second connector module, so that the first command processing module of the client system obtains metadata from the data source interface according to the metadata collection command,
the client system sends the metadata to the cloud server through the first connector module, so that the cloud server determines that a connection configuration is completed according to the metadata.

8. The data gateway system according to claim 5, wherein the client system further comprises:
a data source;
a data processing module, coupled to the first gateway module and the data source, and comprising:
a data detector; and
a third connector module,
the data detector of the data processing module accesses the data source through the third connector module according to a data-fetching command sent by the cloud server to obtain a target data.

9. The data gateway system according to claim 8, wherein the data processing module further comprises:
a data stream control module; and
a data encryption module,
wherein the second gateway module of the cloud server further comprises:
a data decryption module, wherein the data processing module encrypts the target data through the data encryption module, and sends the encrypted target data to the cloud server through the data stream control module and the third connector module, so that the cloud server decrypts the encrypted target data through the data decryption module to obtain the target data.

10. The data gateway system according to claim 9, wherein the client system performs at least one of data format conversion, data filtering, and data desensitization on the target data through the data processing module.

11. A data intercommunication method, comprising:
performing a command listening for a cloud server through a listener module of a client system;
when the listener module obtains connection configuration information, sending a connection request command to the cloud server through a first connector module by the client system;
receiving the connection request command through a second connector module of the cloud server;
determining, by an authentication management module of the cloud server, whether the client system has a permission according to the connection request command, so as to issue a gateway code;
sending the gateway code to the first connector module of the client system through the second connector module of the cloud server; and
establishing a connection between the client system and the cloud server through the client system based on the gateway code.

12. The data intercommunication method according to claim 11, wherein the client system comprises a first gateway module, and the first gateway module comprises the first connector module, the listener module, and a first command processing module,
wherein the cloud server comprises a second gateway module, and the second gateway module comprises the second connector module, the authentication management module, and a second command processing module,
wherein the listener module of the client system listens to the second command processing module of the cloud server to determine whether the second command processing module generates the connection configuration information.

13. The data intercommunication method according to claim 12, further comprising:
when the authentication management module issues the gateway code, storing the gateway code through a configuration management module of the second gateway module of the cloud server.

14. The data intercommunication method according to claim 13, further comprising:
when the second command processing module of the cloud server obtains gateway information, obtaining a configuration command from the configuration management module according to the gateway information through the second command processing module;
sending the configuration command to the first gateway module of the client system through the second connector module; and
performing a connection test through a connection management module in the first gateway module of the client system according to the configuration command.

15. The data intercommunication method according to claim 14, wherein the step of performing the connection test through the connection management module in the first gateway module of the client system according to the configuration command comprises:
performing the connection test on a data source interface through the connection management module;
when the connection test fails, performing the connection test again through the connection management module according to the configuration command; and
when the connection test is passed, notifying the cloud server that a connection is successful through the first connector module.

16. The data intercommunication method according to claim 15, wherein when the connection test is passed, the client system stores the configuration command in the configuration management module in the first gateway module.

17. The data intercommunication method according to claim 15, further comprising:
when the connection test is passed, configuring a metadata collection command through the second command processing module of the cloud server;
sending the metadata collection command to the client system through the second connector module;
obtaining metadata from the data source interface according to the metadata collection command through the first command processing module of the client system;
sending the metadata to the cloud server through the first connector module of the client system; and
determining that a connection configuration is completed through the cloud server according to the metadata.

18. The data intercommunication method according to claim 15, further comprising:
a data detector of a data processing module of the client system accesses a data source of the client system through a third connector module of the data processing module according to a data-fetching command sent by the cloud server so as to obtain a target data.

19. The data intercommunication method according to claim 18, further comprising:
encrypting the target data through a data encryption module of the data processing module;
sending the encrypted target data to the cloud server through a data stream control module of the data processing module and the third connector module; and
decrypting the encrypted target data through a data decryption module of the cloud server so as to obtain the target data.

20. The data intercommunication method according to claim 19, wherein the step before encrypting the target data further comprises:
performing at least one of data format conversion, data filtering, and data desensitization on the target data through a data conversion module of the data processing module.

* * * * *